United States Patent [19]

Nix et al.

[11] Patent Number: 4,909,131
[45] Date of Patent: Mar. 20, 1990

[54] SNAP-CONNECTED MULTI-PART CYLINDER FOR PULL-TYPE MASTER CYLINDER

[75] Inventors: Richard A. Nix; Charles A. Kassin, both of Utica; David C. Barker, Oak Park, all of Mich.; Marina Kassin, Executrix of said Charles A. Kassin, deceased

[73] Assignee: Automotive Products plc, Warwickshire, England

[21] Appl. No.: 112,834

[22] PCT Filed: Dec. 18, 1986

[86] PCT No.: PCT/US86/02762

§ 371 Date: Jul. 31, 1987

§ 102(e) Date: Jul. 31, 1987

[87] PCT Pub. No.: WO87/03850

PCT Pub. Date: Jul. 2, 1987

Related U.S. Application Data

[63] Continuation-in-part of Ser. No. 812,002, Dec. 23, 1985, abandoned.

[51] Int. Cl.$^4$ .......................... B60T 11/22; F16J 10/02
[52] U.S. Cl. .................. 92/169.1; 92/170.1; 60/588; 285/921
[58] Field of Search .................. 92/169.1, 170.1, 171.1; 60/533, 588; 403/377; 285/921

[56] References Cited

U.S. PATENT DOCUMENTS

| | | | |
|---|---|---|---|
| 1,538,007 | 5/1925 | Schellin | 285/921 X |
| 2,140,751 | 12/1938 | LaBrie et al. | 60/588 |
| 2,195,244 | 3/1940 | Ericson | 60/588 X |
| 2,205,806 | 6/1940 | Belenkij | 60/589 |
| 2,377,017 | 5/1945 | Lacoe | 60/588 |
| 3,065,604 | 11/1962 | Randol | 60/588 |
| 3,156,097 | 11/1964 | Brown | 60/588 |
| 3,312,149 | 4/1967 | Fleckenstein et al. | 92/170 X |
| 3,487,641 | 1/1970 | Hackett | 60/589 X |
| 3,543,643 | 12/1970 | Southwell | 92/169 X |
| 3,800,674 | 4/1974 | Sember et al. | 60/533 X |
| 4,103,492 | 8/1978 | Sakazume | 60/588 |
| 4,162,616 | 7/1979 | Hayashida | 60/533 |
| 4,442,671 | 4/1984 | Reynolds | 60/547.1 |
| 4,455,832 | 6/1984 | Gaiser et al. | 60/588 |
| 4,495,772 | 1/1985 | Furuta et al. | 60/533 |
| 4,510,752 | 4/1985 | Gaiser | 92/171.1 |
| 4,527,395 | 7/1985 | Gaiser et al. | 92/171.1 |
| 4,532,856 | 8/1985 | Taylor | 285/921 X |
| 4,779,902 | 10/1988 | Lee | 285/921 X |

FOREIGN PATENT DOCUMENTS

| | | | |
|---|---|---|---|
| 0088019 | 2/1983 | European Pat. Off. | |
| 144563 | 11/1979 | Japan | 92/169.1 |
| 558857 | 1/1944 | United Kingdom | 60/588 |
| 1065599 | 12/1965 | United Kingdom | |

Primary Examiner—Robert E. Garrett
Assistant Examiner—George Kapsalas
Attorney, Agent, or Firm—Krass & Young

[57] ABSTRACT

A hydraulic master cylinder formed by telescopically fastening together a pair of cylinder housings to form a cylinder. A piston in the cylinder is operative to transfer hydraulic fluid to a slave cylinder connected to the master cylinder. The pressure or power stroke of the piston is effected by exerting a pull on the piston by a pull cable attached to one side of the piston. A body, attached to one of the cylinder housing, provides a reservoir for hydraulic fluids. A cap on the reservoir closes a fluid filling opening. Expansion bellows in the reservoir accommodates changes in the fluid level in the reservoir as the piston is being reciprocated. The bellows is connected to the cap so as to be removed as a unit with the cap when the reservoir is being filled. In one embodiment of the invention the pair of cylinder housings are secured together by threaded connector means and a single O-ring is used as a seal from the ambient pressure as well as a seal between high and low pressure sides of the pressure chamber. In another embodiment of the invention, the housings are formed of a plastic material and are snappingly secured to each other by insertion of one member within the other member. This embodiment also includes locator means to ensure that the housing members will be properly angularly located relative to each other in their assembled position.

7 Claims, 4 Drawing Sheets

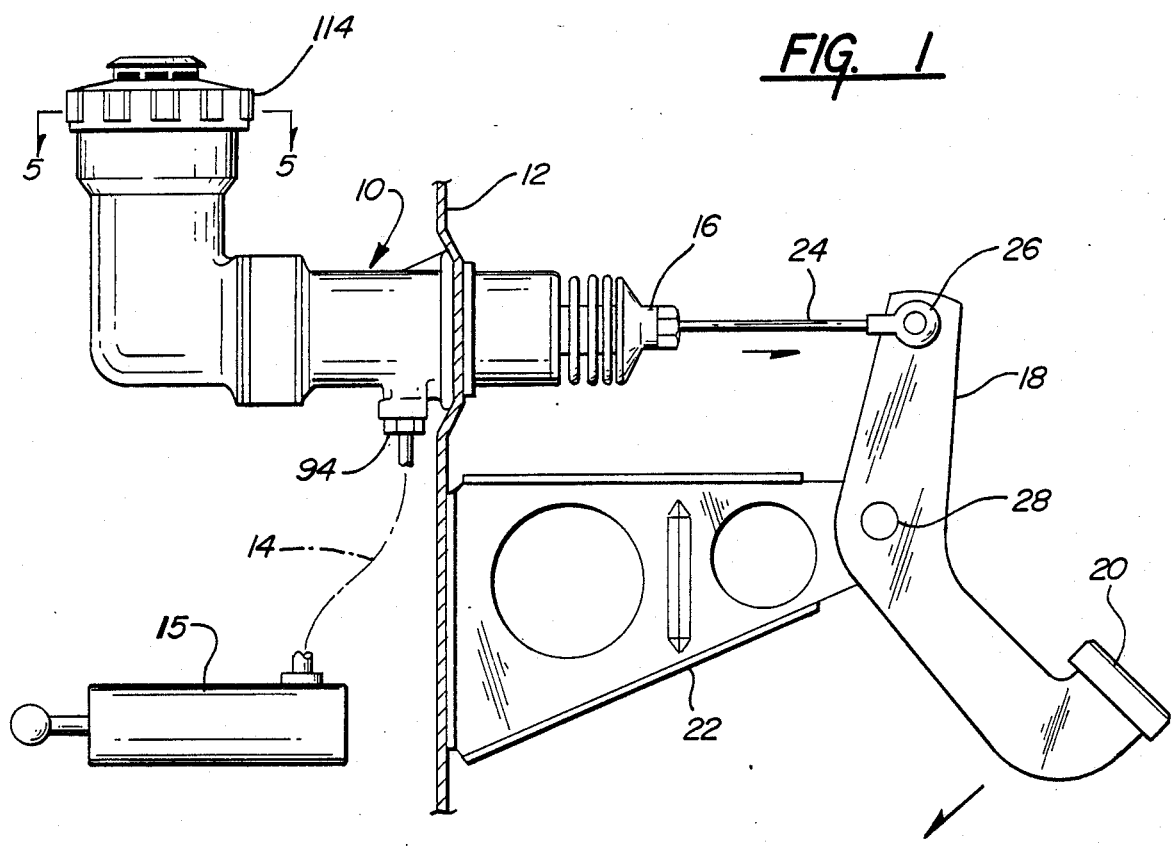
FIG. 1
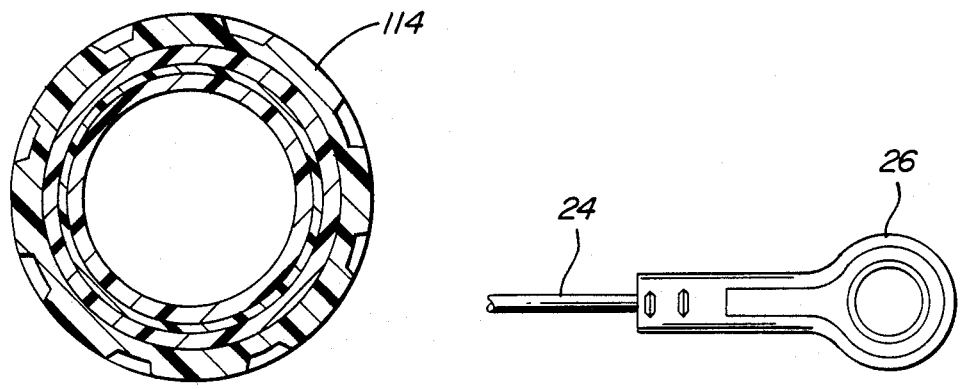
FIG. 5
FIG. 4

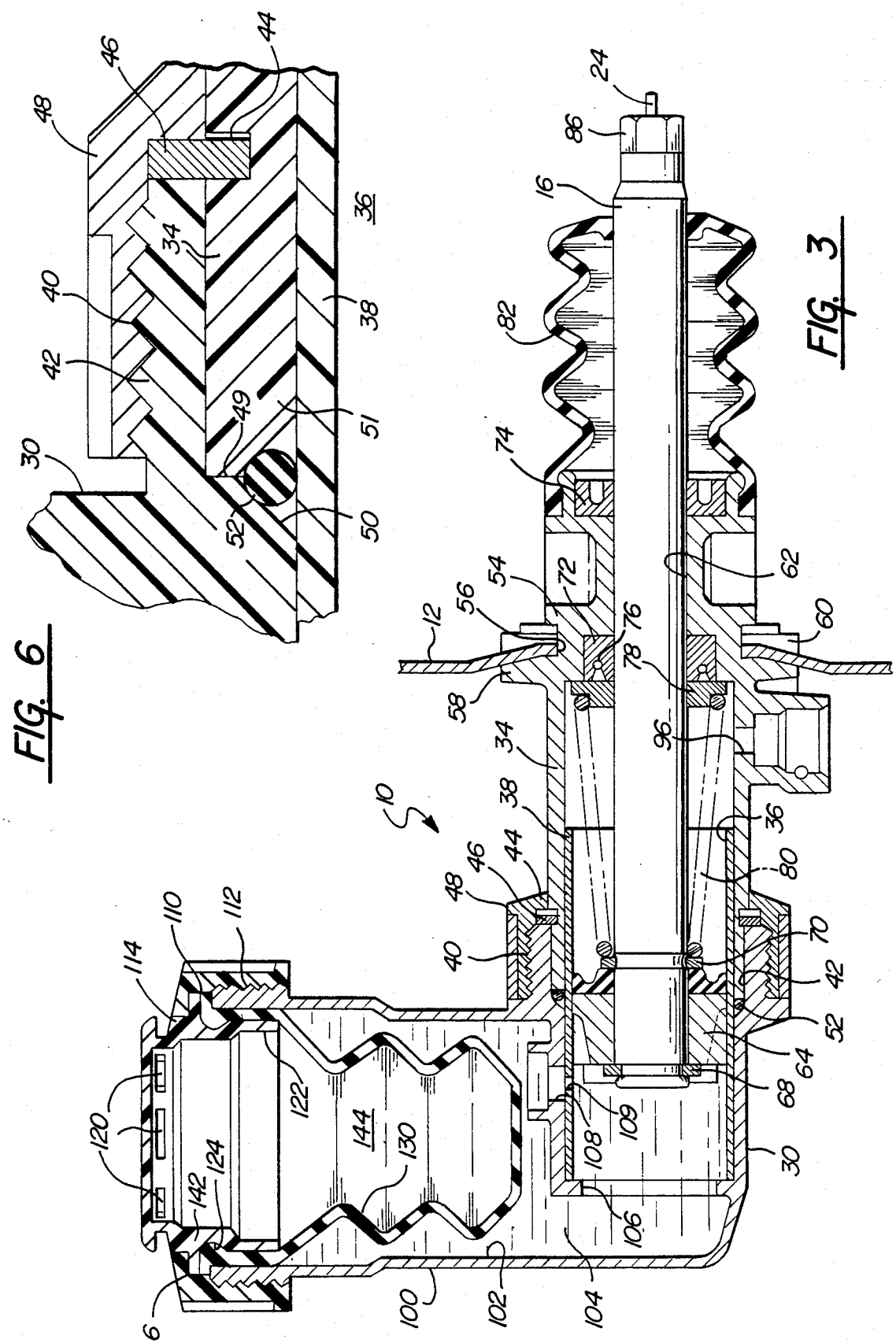

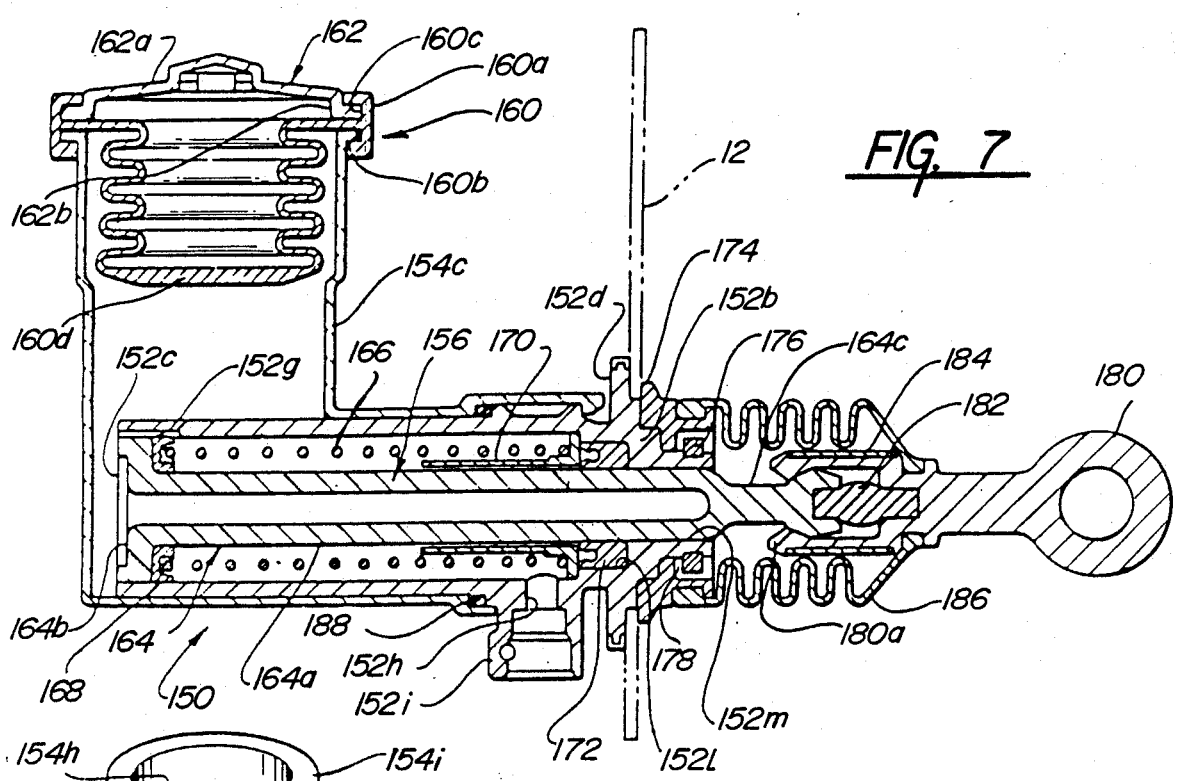
FIG. 7
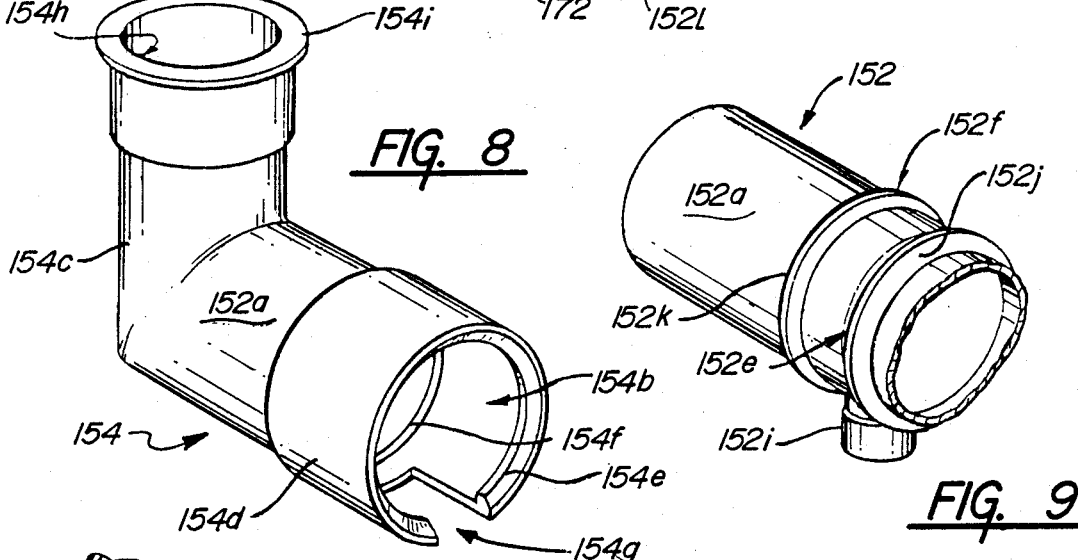
FIG. 8
FIG. 9
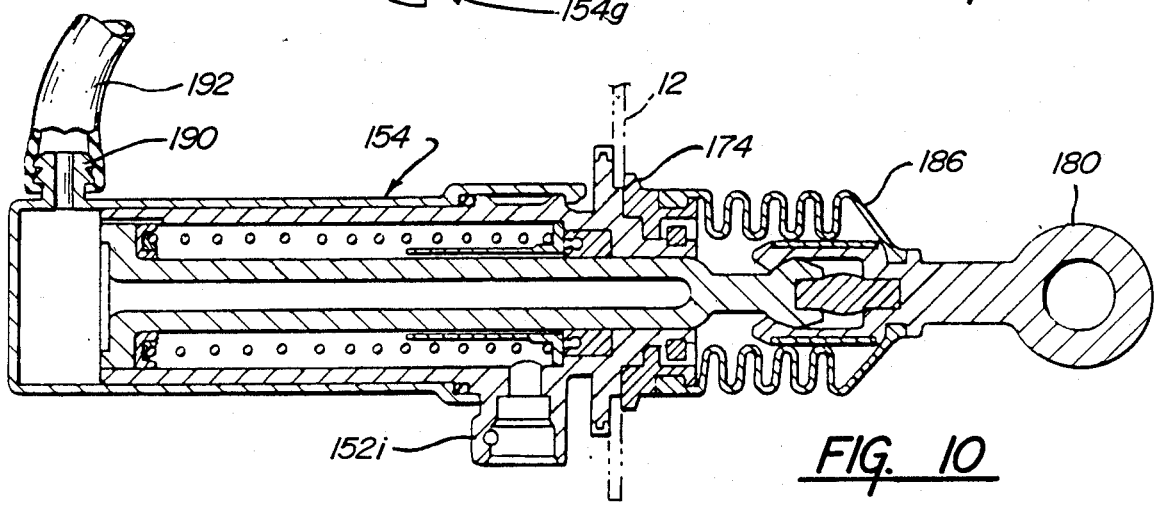
FIG. 10

SNAP-CONNECTED MULTI-PART CYLINDER FOR PULL-TYPE MASTER CYLINDER

This application is a continuation-in-part of our earlier U.S. application Ser. No. 06/812,002 filed Dec. 23, 1985, now abandoned.

BACKGROUND OF THE INVENTION

This invention is related to master cylinders that are adapted to be pre-filled and pre-bled before being taken to an assembly site such as an automotive plant. Typically, such master cylinders comprise an elongated, hollow, cast metallic body defining an internal pressure chamber and including a pressure producing piston. A cap on one end of the body closes the chamber and has an opening for the piston rod. The pressure chamber is connected to an integral or remote reservoir for replenishing any fluid loss in the system. The reservoir has a filling opening, and a vented cap is mounted on the filling opening. Prefilled master cylinders of this general construction are shown for example in U.S. Pat. No. 4,407,125 entitled "Liquid Pressure Apparatus," issued on Oct. 4, 1983 to David Parsons and assigned to Automotive Products plc of Warwichsire, England.

Master cylinders of this general construction are generally satisfactory but are relatively expensive and complicated to produce. Further, there is a problem with maintaining master cylinders of this type since frequently a mechanic will remove the cap of the reservoir to replenish the hydraulic fluid but fail to remove the bellows positioned within the open upper end of the reservoir with the result that hydraulic fluid is introduced into the bellows rather than into the working portion of the reservoir.

SUMMARY OF THE INVENTION

This invention is directed to the provision of an improved master cylinder assembly having a construction which provides a more efficient and less expensive assembly.

This invention is further directed to the provision of a master cylinder which has provision to obviate the problem of inadvertently filling the bellows rather than the reservoir itself.

According to a basic feature of the present invention, the master cylinder is constructed as a pair of cylinder housings that are assembled by telescopically inserting the end of one cylinder housing into the other.

In one embodiment of the invention, a locking ring connects the two cylinders housings together in their assembled position and a single O-ring is mounted between the two cylinder housings to seal the pressure chamber from atmospheric pressure and to form a seal between the high and low pressure sides of the pressure chamber.

In another embodiment of the invention, the cylindrical housings are formed of a plastic material and are snap secured to each other by insertion of one member within the other member. The coacting means which operate to snappingly secure the two housings together comprise an external circumferentially extending lip on one of the cylindrical housings coacting with an internal circumferentially extending lip on the other of the housing. This embodiment also has means to ensure that the housing members will be properly angularly located relative to each other in their assembled position. The locating means comprises a locator portion projecting outwardly from one of the housing member and a slot adjacent the open end of the other housing member. As the members are telescopically inserted one within the other, the slot in the outer member slides over the locator portion on the inner member to angularly locate the outer member relative to the inner member. In the preferred form of this embodiment the locator portion of the inner member is constituted by a fitting surrounding the discharge port of the inner member, the fitting extends downwardly from the inner member, the other member includes an upstanding reservoir portion, the slot in the other member is provided on the underside of that member, and the slot and fitting coact during the assembly process to ensure that the second member is mounted on the first member with the reservoir in a generally upstanding disposition.

The features described above have particular application to a master cylinder of the pull type but also have application to push type master cylinders.

According to another feature of the invention, the bellows in the reservoir is connected to the vent cap in such a manner as to be removed together with the vent cap to avoid the problem of the user accidentally delivering hydraulic fluid into the bellows rather than into the reservoir proper.

BRIEF DESCRIPTION OF THE DRAWINGS

FIG. 1 illustrates a master cylinder embodying the invention connected to a lever for pulling the piston rod from the master cylinder in a power stroke;

FIG. 3 is a view similar to FIG. 2 but showing the piston rod partially extended from the piston in a power stroke;

FIG. 4 is an enlarged view of the eye attached to the piston rod pull cable;

FIG. 5 is an enlarged cross-sectional view of the vent cap as seen along lines 5—5 of FIG. 1;

FIG. 6 is an enlarged sectional view of the sealing area between two housings forming the master cylinder;

FIG. 7 illustrates a modified form of master cylinder embodying the invention and including two housing members;

FIG. 8 is a perspective view of one of the housing members of the master cylinder of FIG. 7;

FIG. 9 is a fragmentary perspective view of the other housing member of the master cylinder of FIG. 7; and FIG. 10 illustrates a further modified form of master cylinder embodying the invention.

DETAILED DESCRIPTION OF THE PREFERRED EMBODIMENT

Figure 2:
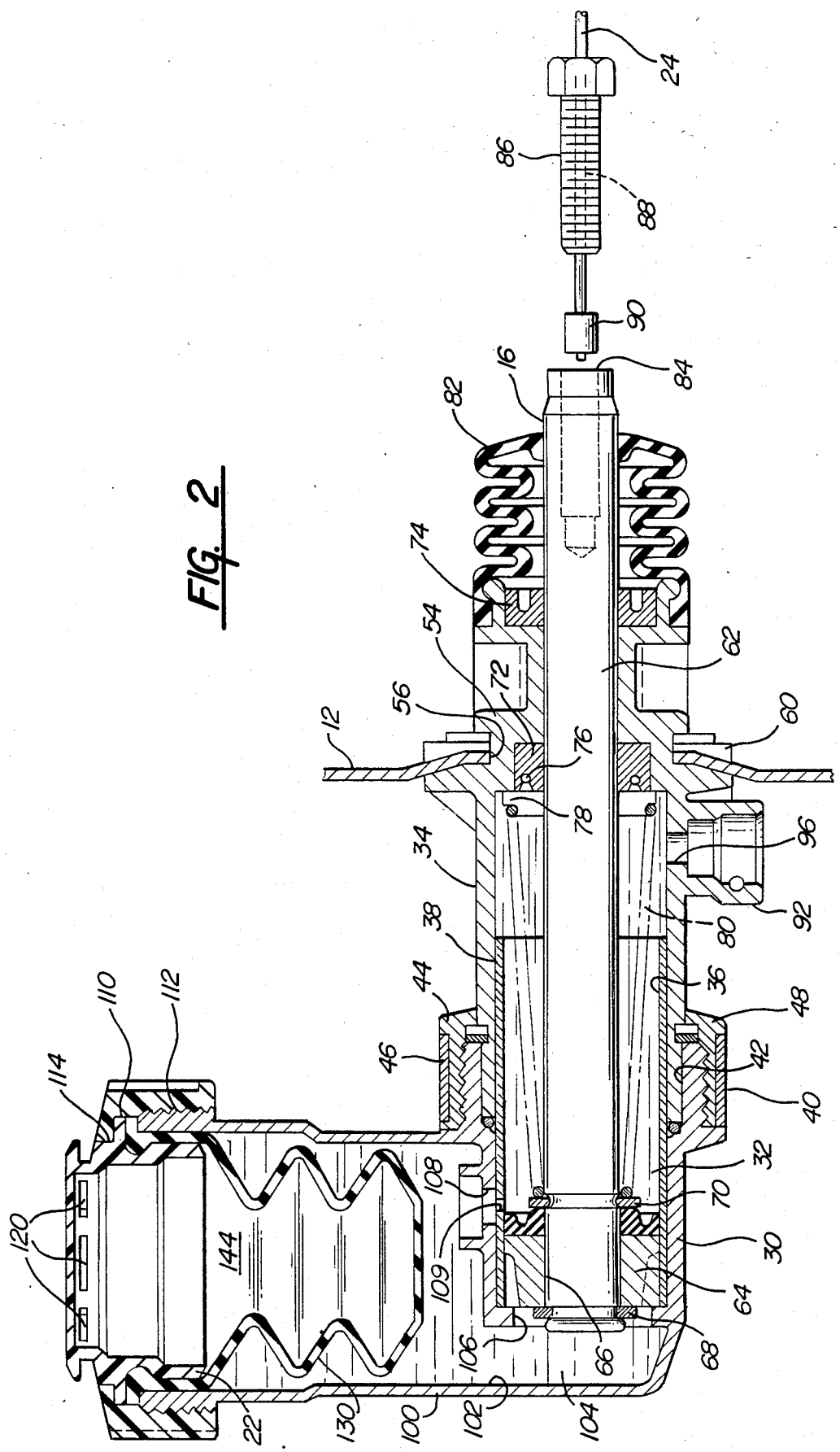
FIG. 2 is an enlarged, partially exploded, sectional view of the master cylinder illustrating the piston rod at the end of a return stroke.

Referring to the drawings, FIG. 1 illustrates a master cylinder 10 mounted on a support, such as a vehicle frame 12, for delivering hydraulic fluid through a conduit 14 to a slave cylinder 15 as a piston rod 16 is being pulled from the cylinder 10. By way of illustration, a lever 18, having a foot receiving pad 20, is mounted for pivotal motion on a bracket 22. A cable 24 is attached to the piston rod 16 and connected by an eye means 26 to the lever 18 such that as the lever 18 is being pivoted around pivot means 28, the piston rod 16 is pulled in a power stroke.

Referring to FIGS. 2 and 3, the master cylinder 10 includes a cylinder housing 30 having an internal bore 32 and a second cylinder housing 34 telescopically receiving one end of the cylinder housing 30. The two cylinder housings 30 and 34 are connected together to form an internal pressure chamber 36.

A cylindrical liner 38 is mounted inside the housing 30 so as to extend into the housing 34.

Referring to FIG. 6, the housing 30 has a threaded section 40 formed on an annularly enlarged section 42 which receives the inner end of the housing 34. Housing 34 has an annular groove 44. A snap ring 46 is receive in the groove 44 in such a manner as to abut the end of the housing 30 when the two cylinder housings are being assembled to precisely define the overall length of the pressure chamber 36. An internally threaded collar 48, mounted on the housing 34, threadably engages the threaded section 40 to tightly connect the two housings together.

The inner end of annular section 42 defines an annular shoulder 49 having an annular beveled section 50. The extreme end of the housing 34 has an annularly beveled section 51 adjacent the beveled section 50 so that the two beveled sections 50 and 51 and the outer surface of the cylinder liner 38 define an annular cavity for seating a resilient O-ring 52.

The opposite ends of the liner 38 are exposed to the high and low pressure sides of the pressure chamber 36. Thus, O-ring 52 provides a seal between the high and low pressure sides of the pressure chamber 36 to obviate any pressure loss due to a loose fit between the cylinder liner 38 and the housings 30 and 34. In addition, the O-ring 52 provides a seal obviating any pressure loss to the atmosphere through the joint between the housing 30 and the housing 34.

The housing 34 has a longitudinal extension 54 received through an opening 56 in abutment with one side of the frame 12. Fastener means 60 are mounted on the extension 54 in abutment with the opposite side of the frame 12 to cooperate with the shoulder 58 to fasten the master cylinder 10 to the vehicle frame 12. The extension 54 has a piston rod opening 62 slidably receiving the piston rod 16.

A piston 64 is slidably mounted in the liner 38 and has a central opening 66. One end of the piston rod 16 is received in the central opening 66. A clip 68 is mounted in a groove on the piston rod 16 adjacent one side of the piston 64, and a second clip 70 is mounted in a groove on the piston rod 16 on the side of the piston 64 to locate the piston 64 on the piston rod 16.

An annular seal 72 is mounted in the housing 34 on one side of the piston rod opening 62 and slidably engaged with the piston rod 16. A second seal 74 is mounted on the outer side of the piston rod opening 62 and slidably engaged with the piston rod 16 so that the two seals 72 and 74 provide a fluid-tight seal between the piston rod 16 and the cylinder housing 34.

A spring retainer 76 holds the seal 72 in position.

An annular seat 78 is mounted in the end of the pressure chamber 36 adjacent the seal 72. A spring bias member 80 is mounted in the pressure chamber 36 between the clip 70 and the annular seat 78 to bias the piston 64 towards the piston rod's return position, that is, toward the low pressure end of the chamber 36 or toward the left end of the pressure chamber 36 as viewed in FIGS. 2 and 3.

An expandable boot 82 is slidably mounted on the outer end of the piston rod 16 and connected to the cylinder member 34 to provide a dust cover for the piston rod 16.

Still referring to FIGS. 2 and 3, the outer end of the piston rod 16 has an internally threaded opening 84 for receiving a bolt 86. The bolt 86 has a longitudinal bore 88. The cable 24 is threaded through the bore 88 and carriers a body 90 which is received in the bottom of the opening 84. The bolt 86 and body 90 provide means for fastening the cable 24 to the piston rod 16. This arrangement permits the piston rod 16 to be pulled in a power stroke in a motion from left to right as viewed in FIG. 1 in response to an actuating motion applied to the pad 20.

The bottom of the housing 34 has an internally threaded nipple 92 for threadably receiving the conduit 14 and a nut 94. The conduit 14 may, in turn, be connected to the slave cylinder 15. The nipple 92 has a port providing fluid communication between the pressure chamber 36 and the conduit 14.

An upstanding hollow body 100 is formed integrally with the housing 30 to provide a reservoir 102 for containing hydraulic fluid 104. The housing 30 has a relatively large end opening 106 providing fluid communication between the reservoir 102 and the pressure chamber 36. The housing 30 also has a smaller opening 108 in its side wall aligned with a small port 109 in the liner 38.

The location of the port 109 is such that when the piston 64 is in its left-most position as viewed in FIG. 2, prior to commencing a power stroke, the high pressure end of the pressure chamber 36 between the piston 64 and the port 96 is in fluid communication with the reservoir 102. This permits any lost fluid on the high pressure side of the piston 64 to be replenished as the piston 64 begins its power stroke. When the piston 64 is being pulled by the piston rod 16, the piston 64 passes the port 109 to increase the pressure of the fluid 104 in the high pressure end of chamber 36. The pressure of the fluid 104 on the opposite or low pressure side of the piston 64 will then experience a reduced pressure causing fluid to pass through the opening 106 from the reservoir 102 into the pressure chamber 36. The spring bias member 80 returns the piston 64 toward its original position adjacent the opening 106 when the actuating force is removed from the pad 20.

The reservoir body 100 has an annular wall 110 defining a top inlet opening for receiving fluid into the reservoir 102. The wall 110 is externally threaded at 112. A vent cap 114 is seated on the top edge of the wall 110. The vent cap 114 has a series of port means 120 which permit air to enter but restricts water from entering into the reservoir 102.

The vent cap 114 has a downward depending, annular wall 122 telescopically received within the reservoir wall 110. The wall 122 has an annular groove 124. The outer diameter of the wall 122 is slightly less than the inner diameter of the reservoir wall 110.

A flexible, bellows-shaped diaphragm 130 is mounted in the reservoir chamber. The diaphragm 130 has ridged walls so that the internal volume of the diaphragm 130 can be either expanded or reduced. The diaphragm 130 has a top lip 134 seated on the top edge of the reservoir wall 110 and sandwiched between the reservoir wall 110 and a lip 136 carried on the vent cap 114 in such a manner that when the cap 114 is fastened in position the lip 134 provides a fluid-tight seal between the diaphragm 130 and the wall 110.

An internally threaded collar 138 is mounted on the lip 136 and threadably engaged with the reservoir threads 112 to fasten both the cap 114 and the diaphragm 130 on the reservoir body 100.

The vent cap 114 has an annular groove 140 receiving a tight-fitting annular shoulder 142 carried on the diaphragm 130. The arrangement is such that when the vent cap 114 is removed from the reservoir wall 110 to form an opening for delivering the fluid 104 into the reservoir 102, the diaphragm 130 is removed with the vent cap 114. The diaphragm 130 is normally filled with air and subdivides the reservoir 102 into an air chamber 144 and a hydraulic fluid chamber between the diaphragm 130 and cylinder housing 30. The connection between the diaphragm 130 and the vent cap 114 is such that when the user removes the cap 114, the diaphragm 130 is also removed so that the user cannot accidentally fill the diaphragm 130 with hydraulic fluid.

In the use of the FIG. 1-6 embodiment of the invention, the piston 64 is pulled toward the right, as viewed in FIG. 3, in a power stroke by an appropriate effort applied on the pad 20. The piston 64 increases the pressure of the fluid 104 between the piston 64 and the port 96 after piston 64 has passed the port 109. Upon completion of the power stroke and in response to the bias of the spring 80, the piston 64 then returns toward the port 109 creating a reduced pressure between the piston 64 and the port 96.

As the piston 64 is moved toward the port 96 in a power stroke the diaphragm 130 expands to accommodate the flow of fluid from the reservoir 102 into the pressure chamber 36. During the return stroke of the piston 64, the piston 64 delivers fluid into the reservoir 102 thus reducing the internal volume of the diaphragm 130.

Reference is now made to the FIG. 7-9 embodiment of the invention.

In the FIG. 7-9 embodiment, the two housing members are formed of a suitable plastic material; the housing members are designed to be snappingly secured together by a simple insertion of one housing member telescopically into the other housing member; and locator means are provided on the two housing members to ensure that the housing members are properly angularly located relative to each other in their assembled configuration.

The master cylinder 150 of the FIG. 7-9 embodiment, like the cylinder of the FIG. 1-6 embodiment, is of the pull type and is used in an environment of the type shown in FIG. 1 wherein depression of the pedal 20 results in the piston of the master cylinder assembly being pulled in a power stroke.

Master cylinder 150 includes a housing 152, a housing 154 and a piston assembly 156.

Housing 152 is formed of a suitable plastic material and includes a cylindrical main body portion 152a having a closed end 152b, an open end 152c, and an external annular flange 152d adjacent closed end 152b. A first circumferentially extending external connector lip or flange 152e is provided on main body portion 152a proximate the closed end 152b and a second circumferentially extending external sealing lip or flange 152f is provided on main body portion 152a in axially spaced relation to lip 152e. An axially extending groove 152g is provided in main body portion 152a adjacent the open end 152c therof. A discharge port 152h is provided in the underside of main body portion 152a proximate closed end 152b and a fitting 152i extends downwardly from the underside of main body portion 152a in concentric surrounding relation to discharge port 152h.

Fitting 152i has a diameter generally corresponding to the axial spacing between lips 152e and 152f and is generally vertically aligned with lips 152e and 152f with the right hand axial extent of fitting 152i generally flush with the vertical annular edge 152j of lip 152e and the leftward axial extent of fitting 152i generally flush with the vertical annular edge 152k of lip 152f.

Housing member 154 is also formed of a suitable plastic material and includes a main body portion 154a having an open end 154b, and a reservoir portion 154c upstanding from main body portion 154a at the other or closed end thereof. Main body portion 154a is stepped radially outwardly adjacent its open end to provide a collar portion 154d. A radially inwardly extending circumferential lip 154e is provided at the outer or open end of collar portion 154d and an annular shoulder 154f is defined at the juncture between collar portion 154d and the remainder of main body portion 154a. A slot 154g is provided at the underside of collar portion 154e. Slot 154g extends axially from the open end of collar portion 154d to a location proximate shoulder 154f. The upper end 154h of reservoir portion 154c is open and receives a diaphragm 160 and a reservoir cap 162. Diaphragm 160 is formed of a suitable elastomeric material and includes a collar portion 160a and a bellows portion 160d. Collar portion 160a includes a lower peripheral groove 160b snappingly received over a flange 154i defined at the upper end 154h of bellows portion 154c and further includes an upper circumferential groove 160c. Cap 162 includes a central main body portion 162a and a peripheral flange portion 162b received within groove 160c of diaphragm 160.

Piston assembly 156 includes a piston member 164 and a spring 166.

Piston member 164 is formed of a suitable metallic material and includes a hollow central main body portion 164a, a head portion 164b, and a connector portion 164c.

In the assembly of the invention master cylinder assembly, a seal 168 is slid over piston 164 and seated against piston head portion 164b; spring 166 is positioned over piston 164; a spring guide 170 is positioned over piston 164 in engagement with the free end of spring 166; a seal 172 is positioned in a counterbore 152l adjacent the closed end of member 152; the piston subassembly is slid telescopically into the open end 152c of member 152 to pass piston 164 through an aperture 152m in closed end 152b and position spring guide 170 against seal 172; a twist lock nut 174 is positioned on the closed end 152b of member 152 by a snap ring 176 and wave washer 178; pull rod 180 is secured to the free end of piston 164 with an elastomeric spacer and anti-rattle member 182 positioned therebetween; a metal sleeve 184 is positioned over the connector end 180a of pull rod 180; a boot 186 is secured at one end to the pull rod and at its other end to twist and lock nut 174; an O-ring 188 is positioned over main body portion 152a of member 152 in abutting engagement with lip 152f; rim portion 160a of diaphragm 160 is snapped over flange portion 154i of reservoir portion 154c; cap 162 is positioned within upper groove 160d of diaphragm rim portion 160a; and member 154 is slipped telescopically over the open end 152c of member 152. As the leading edge of member 154 moves telescopically along the main body portion of member 152, lip 154e moves resiliently over O-ring 188 and lip 152f and thereafter moves resiliently over lip 152e to snappingly engage with the vertical annular edge 152j of that lip and positively secure member 154 to member 152. As member 154 is moved telescopically over member 152, member 154 is positioned angularly such that slot 154g slices over fitting 152i so as to positively angularly locate member 154 on member 152 in a position where reservoir portion 154b is generally upstanding. The abutting engagement of the blind end of slot 154g with the adjacent surface of fitting 152i also determines the seated position of member 154 on member 152 and coacts with the snapping engagement of lip 154e over lip 152e to positively mount member 154 on member 152. The master cylinder is then filled with hydraulic fluid, either by itself or in combination with a tube connected to a slave cylinder, and the filled master cylinder assembly is hipped to an automotive assembly plant.

During the assembly process at the automotive assembly plant, the master cylinder assembly is passed pull rod 180 first through an aperture in bulkhead 12 with twist and lock nut 174 positioned in known manner to present a minimum diameter that will pass through the opening in the bulkhead whereafter, following passage through the bulkhead, member 174 is twisted to the position seen in FIG. 7 to clamp the bulkhead 12 between itself and flange 152d and thereby securely mount the master cylinder assembly to the bulkhead.

In the use of the FIGS. 7-0 embodiment of the invention, the piston 164 is pulled toward the right, as viewed in FIG. 7, in a power stroke by an appropriate effort applied to the associated control pedal. The piston 164 increases the pressure of the fluid between the piston and the port 152h after the piston has passed the inboard end of axial groove 152g. Upon completion of the power stroke and in response to the bias of spring 166, piston 164 is returned to the position of FIG. 7 in which communication is reestablished between the reservoir and the interior of the cylinder through slot 152g so as to create a reduced pressure between the piston head and the port 152h.

The master cylinder assembly as seen in FIG. 10 is generally similar to the assembly of FIGS. 7-9 with the exception that the assembly of FIG. 10 is intended for use with a separate remote reservoir rather than with a reservoir formed integrally with the master cylinder assembly. Specifically, the integral reservoir portion 154c of the FIG. 7 embodiment is eliminated in the FIG. 10 embodiment and replaced with a fitting 190 formed integrally with member 154 for coaction with a suitable hose 192 which will be connected in known manner to the outlet of a remotely positioned reservoir.

The invention master cylinder will be seen to provide an improved two piece arrangement which reduces the aggregate cost of the assembly both by reducing the cost of the individual parts and by reducing the time required to assemble the unit. Further, with respect to the FIGS. 1-6 embodiment, the invention will be seen to provide a novel master cylinder formed by telescopically engaging two cylindrical housings such that the housings cooperate to form a pressure chamber wherein a single O-ring forms a fluid tight seal between the low pressure and high pressure sides of the pressure chamber and also between the pressure chamber and the atmosphere. Further, with respect to the FIG. 7-9 embodiment, the invention provides an inexpensive master cylinder assembly in which the two parts forming the pressure chamber of the assembly may be inexpensively formed of plastic, in which the two parts are secured together in a simple telescoping and snapping operation, and in which means are provided which function during the telescopic insertion of one member over the other member to positively angularly locate the one member with respect to the other member and thereby positively position the assembly with respect to the reservoir for the assembly.

Whereas preferred embodiments of the invention have been illustrated and described in detail it will be apparent that various changes may be made in the disclosed embodiment without departing from the scope or spirit of the invention.

We claim:

1. A master cylinder actuator comprising:
   (A) a first housing member having a cylindrical bore and defining an open end and a closed end defining a piston rod opening;
   (B) a second housing member having a cylindrical bore and being telescopically received over said first housing member in an assembled position to cooperate therewith to form a fluid pressure chamber;
   (C) coacting connecting means on said first and second housing members operative in response to telescoping insertion of said first housing member into said second housing member to snappingly secure said first housing member to said second housing member in said assembled position;
   (D) a piston disposed in said fluid pressure chamber for reciprocal, slidable motion and dividing said pressure chamber into high and low pressure sides; and
   (E) a piston rod connected to the piston so as to be movable therewith, the piston rod being receivable in said piston rod opening so as to project exteriorly of said pressure chamber;
   (F) said first housing member having a discharge port for passing a fluid, said discharge port being in fluid communication with said high pressure side of said pressure chamber such that the piston is operative to pass fluid through said discharge port as the piston is being moved in said pressure chamber toward said closed end of said first housing member;
   (G) said second housing member including an open end and a closed end;
   (H) said first housing member including a locator portion projecting outwardly therefrom;
   (I) said second housing member including a locator slot extending axially from said open end thereof and sized to slidably receive said locator portion of said first housing member in response to telescoping insertion of said first housing member into said second housing member so as to angularly locate said second housing member on said first housing member.

2. A master cylinder actuator according to claim 1 wherein:
   (J) said locator portion of said first housing member comprises an integral fitting extending outwardly from said first housing member proximate said closed end thereof in surrounding relation to said port means; and
   (K) said locator slot is sized to slidably receive said fitting.

3. A master cylinder actuator comprising:
   (A) a first housing member having a cylindrical bore and defining an open end and a closed end defining a piston rod opening;

(B) a second housing member having a cylindrical bore and being telescopically received over said first housing member in an assembled position to cooperate therewith to form a fluid pressure chamber;
(C) a piston disposed in said fluid pressure chamber for reciprocal, slidable motion and dividing said pressure chamber into high and low pressure sides;
(D) a piston rod connected to the piston so as to be movable therewith, the piston rod being receivable in said piston rod opening so as to project exteriorly of said pressure chamber;
(E) said first housing member having a discharge port for passing a fluid, said discharge port being in fluid communication with said high pressure side of said pressure chamber such that the piston is operative to pass fluid through said discharge port as the piston is being moved in said pressure chamber toward said closed end of said first housing member; and
(F) coacting connecting means on said first and second housing members operative in response to telescoping insertion of said first housing member into said second housing member to snappingly secure said first housing member to said second housing member in said assembled position.

4. A master cylinder actuator according to claim 3 wherein:
(H) said housing members are formed of a resilient material; and
(I) said coacting means comprises an external circumferentially extending connector lip on one of said housing members snappingly coacting with an internal circumferentially extending connector lip on the other of said housing members.

5. A master cylinder actuator according to claim 4 wherein:
(J) said second housing member includes an open end and a closed end;
(K) said external circumferentially extending connector lip is provided on said first housing member; and
(L) said internal circumferentially extending connector lip is provided on said second housing member.

6. A master cylinder actuator according to claim 5 wherein:
(M) the open end of said second member is positioned proximate the closed end of said first member;
(N) said external lip is provided on said first housing member proximate the closed end thereof; and
(O) said internal lip is provided on said second housing member proximate the open end thereof.

7. A master cylinder actuator according to claim 5 wherein:
(M) said main body portion of said first housing member further includes an external annular sealing lip spaced axially with respect to said external connector lip towards said open end thereof;
(N) said main body portion of said second housing member includes a radially enlarged collar at said open end thereof forming an internal annular shoulder spaced axially inwardly from the free end of said collar;
(O) said external connector lip is provided at the free end of said collar; and
(P) said actuator further includes an annular sealing ring positioned sealingly between said external annular sealing lip and said annular shoulder in the assembled position of said housing.

* * * * *